United States Patent
Nilsson

(10) Patent No.: US 10,505,607 B2
(45) Date of Patent: Dec. 10, 2019

(54) BEAM TRAINING FOR A WIRELESS DEVICE

(71) Applicant: Telefonaktiebolaget LM Ericsson (publ), Stockholm (SE)

(72) Inventor: Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/525,742

(22) PCT Filed: Apr. 21, 2017

(86) PCT No.: PCT/EP2017/059492
§ 371 (c)(1),
(2) Date: May 10, 2017

(87) PCT Pub. No.: WO2018/192667
PCT Pub. Date: Oct. 25, 2018

(65) Prior Publication Data
US 2018/0331739 A1 Nov. 15, 2018

(51) Int. Cl.
*H04B 7/06* (2006.01)
*H04B 7/0417* (2017.01)
(Continued)

(52) U.S. Cl.
CPC ......... *H04B 7/0617* (2013.01); *H04B 7/0408* (2013.01); *H04B 7/0417* (2013.01);
(Continued)

(58) Field of Classification Search
CPC .... H04B 7/0695; H04B 7/088; H04B 7/0408; H04B 7/0452; H04B 7/086; H04B 7/10
(Continued)

(56) References Cited

U.S. PATENT DOCUMENTS

| | | | |
|---|---|---|---|
| 9,603,156 B2 * | 3/2017 | Kim | H04L 5/0023 |
| 2015/0333884 A1 * | 11/2015 | Athley | H04L 5/0048 375/295 |

(Continued)

FOREIGN PATENT DOCUMENTS

| | | |
|---|---|---|
| WO | 2013149741 A1 | 10/2013 |
| WO | 2016089120 A1 | 6/2016 |

OTHER PUBLICATIONS

International Search Report and Written Opinion issued in International Application No. PCT/EP2017/059492, dated Jan. 15, 2018, 15 pages.

*Primary Examiner* — Emmanuel Bayard
(74) *Attorney, Agent, or Firm* — Rothwell, Figg, Ernst & Manbeck, P.C.

(57) ABSTRACT

There is provided mechanisms for beam training. A method is performed by a wireless device. The wireless device comprises at least two analog antenna arrays. Each of the at least two analog antenna arrays is configured to use at least two respective beams, one at a time. The method comprises sweeping through the beams for obtaining measurements of reference signals as transmitted by a network node by simultaneously using one beam from each analog antenna array such that beams from all the analog antenna arrays are simultaneously swept through for receiving the reference signals. The method comprises determining which combination of beams to use for communicating with the network node based on measurements of the reference signals as received for each beam and for each analog antenna array when sweeping through the beams. The combination of beams includes one beam from each antenna array.

17 Claims, 5 Drawing Sheets

(51) Int. Cl.
*H04B 7/0408* (2017.01)
*H04B 7/08* (2006.01)
*H04W 16/28* (2009.01)

(52) U.S. Cl.
CPC ......... *H04B 7/0626* (2013.01); *H04B 7/0634* (2013.01); *H04B 7/0695* (2013.01); *H04B 7/086* (2013.01); *H04W 16/28* (2013.01)

(58) Field of Classification Search
USPC .................. 375/262, 299, 347–349, 267
See application file for complete search history.

(56) References Cited

U.S. PATENT DOCUMENTS

| | | | |
|---|---|---|---|
| 2016/0142922 A1 | 5/2016 | Chen et al. | |
| 2016/0277089 A1 | 9/2016 | Jung et al. | |
| 2016/0337016 A1 | 11/2016 | Capar et al. | |
| 2016/0337056 A1* | 11/2016 | Frenne | H04B 7/0695 |
| 2016/0373178 A1* | 12/2016 | Nam | H04B 7/0639 |
| 2017/0012359 A1 | 1/2017 | Jung et al. | |
| 2017/0033857 A1 | 2/2017 | Kasher et al. | |
| 2017/0149480 A1* | 5/2017 | Kakishima | H04J 11/00 |
| 2018/0048375 A1* | 2/2018 | Guo | H04B 7/088 |
| 2018/0049042 A1* | 2/2018 | Yu | H04B 7/0695 |
| 2018/0167116 A1* | 6/2018 | Rahman | H04B 7/04 |
| 2018/0219660 A1* | 8/2018 | Cezanne | H04L 5/0007 |
| 2018/0262253 A1* | 9/2018 | Rahman | H04B 7/0626 |
| 2018/0269934 A1 | 9/2018 | Kim et al. | |
| 2018/0279239 A1* | 9/2018 | Si | H04W 56/001 |
| 2018/0288757 A1* | 10/2018 | Sun | H04W 24/04 |
| 2018/0302889 A1* | 10/2018 | Guo | H04W 72/046 |

\* cited by examiner

BEAM TRAINING FOR A WIRELESS DEVICE

CROSS REFERENCE TO RELATED APPLICATION(S)

This application is a 35 U.S.C. § 371 National Stage of International Patent Application No. PCT/EP2017/059492, filed Apr. 21, 2017, designating the United States, the disclosure of which is incorporated by reference.

TECHNICAL FIELD

Embodiments presented herein relate to a method, a wireless device, a computer program, and a computer program product for beam training.

BACKGROUND

In communications systems, there may be a challenge to obtain good performance and capacity for a given communications protocol, its parameters and the physical environment in which the communications system is deployed.

For example, transmission schemes and reception schemes based on the use of narrow beams might be needed at high frequencies to compensate for propagation losses. For a given communication link, a beam can be applied at both the network side (such as at the transmission and reception point (TRP) of a network node) and the user side (such as at wireless devices served by the network node). A beam pair link (BPL) is defined by the beam used by the TRP (denoted TRP beam) for communicating with the wireless device and the beam used by the wireless device (denoted WD beam) for communicating with the TRP. Each of the TRP beam and the WD beam could be used for any of transmission and reception. Likewise, there could be separate BPLs for downlink communications (where the TRP beam is a transmission (TX) beam and where the WD beam is a reception (RX) beam) and uplink communications (where the TRP beam is an RX beam and where the WD beam is a TX beam).

In general terms, a beam management procedure is used to discover and maintain BPLs. A BPL is expected to be discovered and monitored by the network using measurements on downlink reference signals used for beam management, such as channel state information reference signals (CSI-RS). The CSI-RS for beam management can be transmitted periodically, semi-persistently or aperiodic (such as being event triggered) and they can be either shared between multiple wireless devices or be device-specific. In order to find a suitable TRP beam the TRP transmits CSI-RS in different TRP TX beams on which the wireless devices performs reference signal received power (RSRP (measurements and reports back the N best TRP TX beams (where the value of N can be configured by the network). Furthermore, the CSI-RS transmission on a given TRP TX beam can be repeated to allow the wireless device to evaluate suitable WD beams, thus enabling so-called WD RX beam training.

It is expected that the wireless device might use two or more antenna arrays, preferably pointing in different directions, in order to improve the coverage and increase the order of spatial multiplexing.

FIG. 1 is a signaling diagram of a beam training procedure of a wireless device 200 served by a network node 300. The network node 300 (e.g. by means of a TRP) in step S301 transmits a burst of CSI-RS in the same TRP TX beam to let the wireless device 200 perform WD RX beam training. One CSI-RS is needed for every combination of WD RX beams for the multiple antenna arrays at the wireless device 200. For example, if the wireless device 200 has two antenna arrays, and where each antenna array is configured to generate two RX beams, the network node 300 needs to transmit four CSI-RSs, because there are four different combinations of WD RX beams. In step S302 the wireless device 200 measures the RSRP on the received CSI-RS for each WD RX beam combination by sweeping through one WD RX beam at a time. In step S303 the wireless device 200 selects the WD RX beam combination that gave the highest total RSRP.

In view of the above, when the wireless device 200 has multiple antenna arrays and needs to perform WD RX beam training in order to update which beam to use at each antenna array many different beam combinations have to be evaluated. This requires large overhead signaling in downlink since one occurrence of the reference signal needs to be transmitted for every single WD RX beam that should be evaluated.

Hence, there is still a need for an improved beam training procedure for wireless devices.

SUMMARY

An object of embodiments herein is to provide efficient beam training procedure for a wireless device.

According to a first aspect there is presented a method for beam training. The method is performed by a wireless device. The wireless device comprises at least two analog antenna arrays. Each of the at least two analog antenna arrays is configured to use at least two respective beams, one at a time. The method comprises sweeping through the beams for obtaining measurements of reference signals as transmitted by a network node by simultaneously using one beam from each analog antenna array such that beams from all the analog antenna arrays are simultaneously swept through for receiving the reference signals. The method comprises determining which combination of beams to use for communicating with the network node based on measurements of the reference signals as received for each beam and for each analog antenna array when sweeping through the beams. The combination of beams includes one beam from each antenna array.

According to a second aspect there is presented a wireless device for beam training. The wireless device comprises processing circuitry and at least two analog antenna arrays. Each of the at least two analog antenna arrays is configured to use at least two respective beams, one at a time. The processing circuitry is configured to cause the wireless device to sweep through the beams for obtaining measurements of reference signals as transmitted by a network node by simultaneously using one beam from each analog antenna array such that beams from all the analog antenna arrays are simultaneously swept through for receiving the reference signals. The processing circuitry is configured to cause the wireless device to determine which combination of beams to use for communicating with the network node based on measurements of the reference signals as received for each beam and for each analog antenna array when sweeping through the beams. The combination of beams includes one beam from each antenna array.

According to a third aspect there is presented a wireless device for beam training. The wireless device comprises processing circuitry. The wireless device further comprises at least two analog antenna arrays. Each of the at least two analog antenna arrays is configured to use at least two respective beams, one at a time. The wireless device further comprises a storage medium. The storage medium stores instructions that, when executed by the processing circuitry, cause the wireless device to perform operations, or steps. The operations, or steps, cause the wireless device to sweep through the beams for obtaining measurements of reference signals as transmitted by a network node by simultaneously using one beam from each analog antenna array such that beams from all the analog antenna arrays are simultaneously swept through for receiving the reference signals. The operations, or steps, cause the wireless device to determine which combination of beams to use for communicating with the network node based on measurements of the reference signals as received for each beam and for each analog antenna array when sweeping through the beams. The combination of beams includes one beam from each antenna array.

According to a fourth aspect there is presented a wireless device for beam training. The wireless device comprises at least two analog antenna arrays. Each of the at least two analog antenna arrays is configured to use at least two respective beams, one at a time. The wireless device further comprises a beam sweep module configured to sweep through the beams for obtaining measurements of reference signals as transmitted by a network node by simultaneously using one beam from each analog antenna array such that beams from all the analog antenna arrays are simultaneously swept through for receiving the reference signals. The wireless device further comprises a determine module configured to determine which combination of beams to use for communicating with the network node based on measurements of the reference signals as received for each beam and for each analog antenna array when sweeping through the beams. The combination of beams includes one beam from each antenna array.

According to a fifth aspect there is presented a computer program for beam training. The computer program comprises computer program code which, when run on a wireless device, causes the wireless device to perform a method according to the first aspect. The wireless device comprises at least two analog antenna arrays. Each of the at least two analog antenna arrays is configured to use at least two respective beams, one at a time.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these wireless devices, this computer program and this computer program product provide efficient beam training for the wireless device.

Advantageously this method, these wireless devices, this computer program and this computer program product requires less overhead signaling needed in downlink (less transmission of reference signals) than conventional beam training.

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
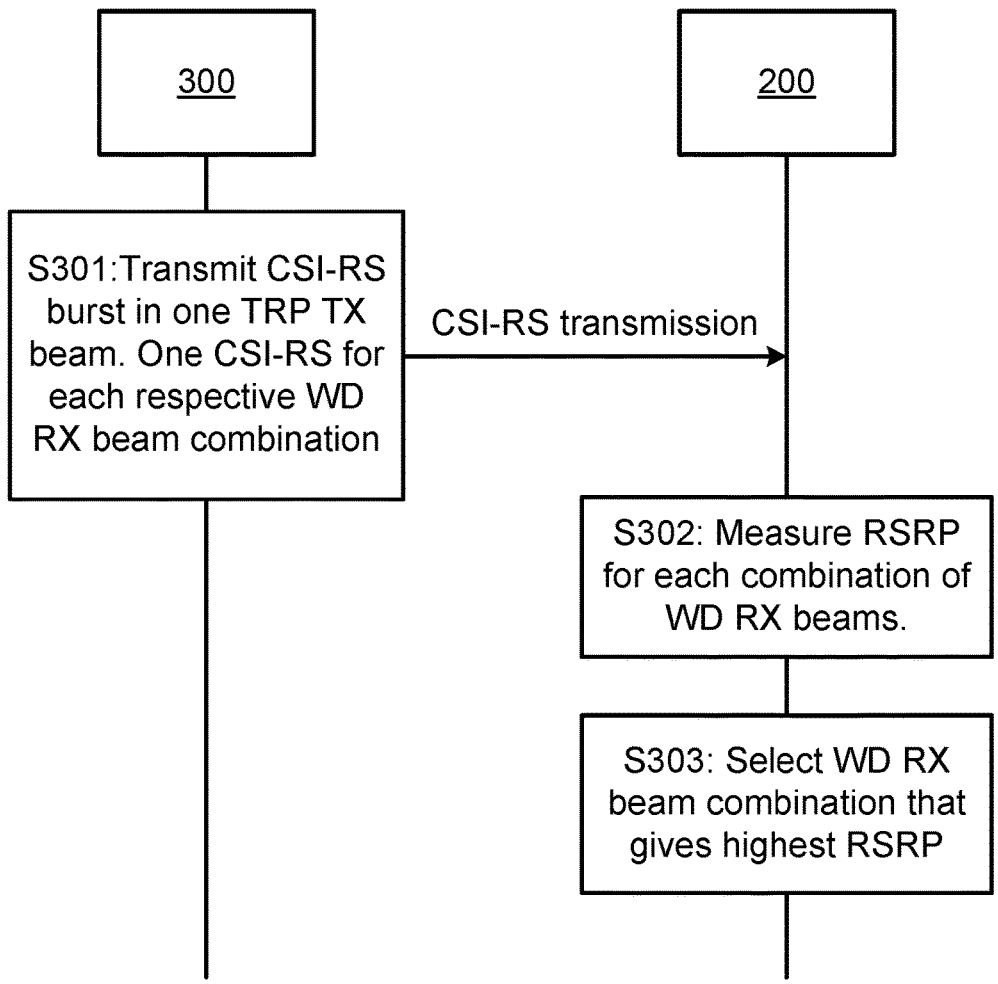
FIG. 1 is a signaling diagram of conventional beam training.
Figure 2:
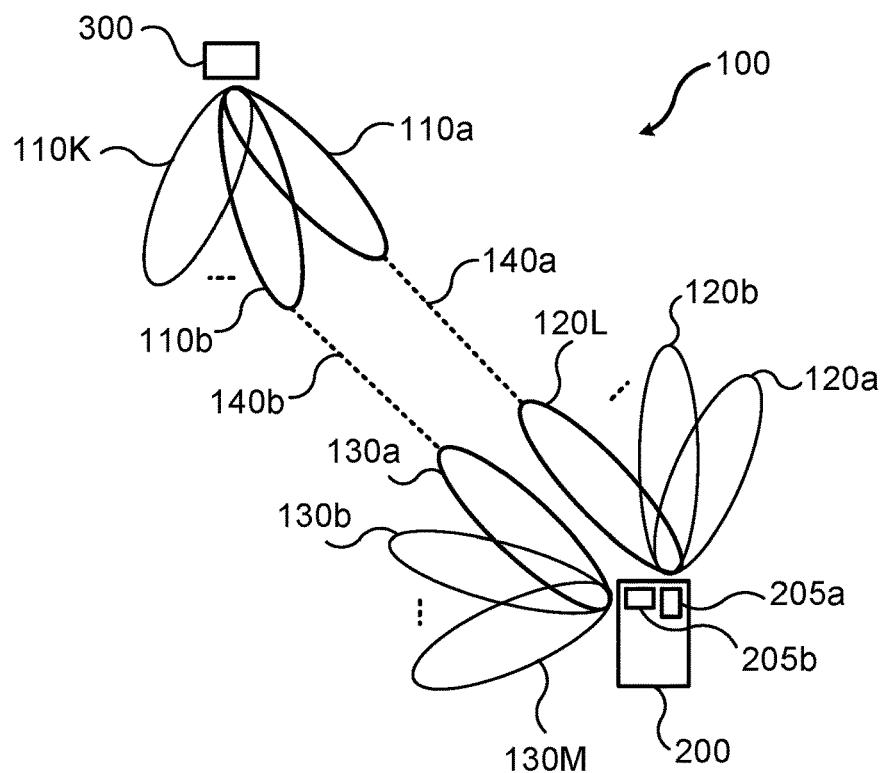
FIG. 2 is a schematic diagram illustrating a communications system according to embodiments.

FIG. 2 is a schematic diagram illustrating a communications system 100 where embodiments presented herein can be applied. The communications system 100 comprises a network node 300 and a wireless device 200. The network node 300 could be any of a radio access network node, radio base station, base transceiver station, Node B, evolved Node B, gigabit Node B, or access point. The network node 300 could comprise a TRP or other type of radio interface in order to communicate with the wireless device 200 in beams 110a, 110b, . . . 110K.

The wireless device 200 could be any of a portable wireless device, mobile station, mobile phone, handset, wireless local loop phone, user equipment (UE), smartphone, laptop computer, tablet computer, network equipped vehicle, or drone. As schematically illustrated in FIG. 2 the wireless device 200 could comprise two or more analog antenna arrays 205a, 205b, preferably pointing in different directions, in order to improve the coverage and increase the order of spatial multiplexing. The wireless device 200 thus comprises at least two analog antenna arrays 205a, 205b in order to communicate with the wireless device 200 in beams 120a, 120b, . . . 120L, 130a, 130b, . . . 130M, where beams 120a-120L are generated at analog antenna array 205a and beams 130a-130M are generated at analog antenna array 205b.

The network node 300 and the wireless device 200 could communicate in BPLs for each of the at least two analog antenna arrays 205a, 205b. In the illustrative example of FIG. 2 there is a BPL 140a, 140b for each of the at least two analog antenna arrays 205a, 205b, where a first BPL 140a is defined by beam 110a at the network node 300 and beam 120L at the wireless device 200 and where a second BPL 140b is defined by beam 110b at the network node 300 and beam 130a at the wireless device 200.

Figure 3:
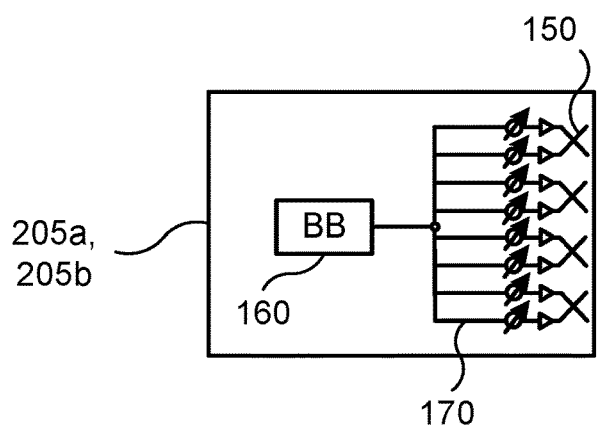
FIG. 3 is a schematic diagram illustrating an antenna array according to an embodiment.

FIG. 3 schematically illustrates an analog antenna array 205a, 205b. The analog antenna array 205a, 205b comprises antenna elements 150. The antenna elements 150 could either be single polarized or dual polarized. For example, the antenna elements 150 could be of mutually orthogonal polarizations. With antenna elements 150 of mutually orthogonal polarizations is understood that pairs of the antenna elements 150 have mutually orthogonal polarizations. Each such pair of antenna elements could define a dual-polarized antenna element. Alternatively, each such pair of antenna elements comprises two single-polarized antenna elements which together have mutually orthogonal polarizations. The analog antenna array 205a, 205b further comprises its own baseband (BB) processing chain 160. Each antenna elements 150 is operatively connected to the baseband processing chain 160 via its own analog beamformer 170, where the analog beamformers 170 of all the antenna elements 150 together define an analog distribution network. Antenna elements 150 of both polarizations could thus be operatively connected to one single baseband chain 160. In total there are N antenna elements 150. If the antenna elements 150 are of mutually orthogonal polarizations there are N/2 antenna elements 150 in each polarization. The analog distribution network comprises e.g. switches, and/or amplifiers, and/or phase shifters and is used to steer the beams of the analog antenna array 205a, 205b, thus enabling beam sweeping at the wireless device 200. Which shape or direction for a particular beam to have at a particular point in time can thus be set by applying the appropriate parameter values, such as state values for the switches, gain values for the amplifiers and/or phase offset values for the phase shifters, in the analog distribution network.

In some aspects each of the analog antenna arrays 205a, 205b is part of a respective antenna panel. According to a first example the analog antenna arrays 205a, 205b of each antenna panel comprise single polarized antenna elements. According to a second example the analog antenna arrays 205a, 205b of each antenna panel comprise dual polarized antenna elements. According to a third example all of the at least two analog antenna arrays 205a, 205b are part of a common antenna panel.

Issues with conventional beam training for wireless devices 200 comprising two or more antenna arrays have been disclosed above.

The embodiments disclosed herein therefore relate to mechanisms for beam training. In order to obtain such mechanisms there is provided a wireless device 200, a method performed by the wireless device 200, a computer program product comprising code, for example in the form of a computer program, that when run on a wireless device 200, causes the wireless device 200 to perform the method.

Figure 4:
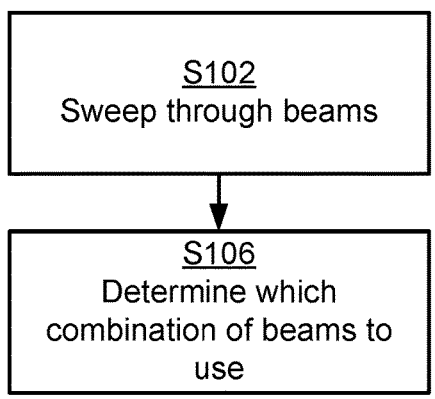
FIGS. 4 and 5 are flowcharts of methods according to embodiments.
Figure 5:
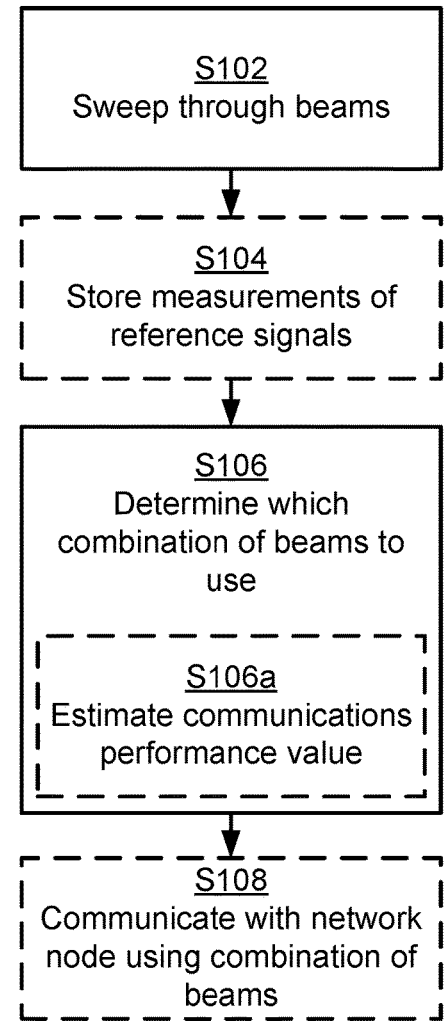

FIGS. 4 and 5 are flowcharts illustrating embodiments of methods for beam training. The methods are performed by the wireless device 200. The methods are advantageously provided as computer programs 920.

Reference is now made to FIG. 4 illustrating a method for beam training as performed by the wireless device 200 according to an embodiment. The wireless device 200 comprises at least two analog antenna arrays 205a, 205b. Each of the at least two analog antenna arrays 205a, 205b is configured to use at least two respective beams 120a-120L, 130a-130M, one at a time. In this respect, the term "to use" is understood as the analog antenna array 205a, 205b can use one beam at a time to wirelessly receive and transmit signals over a radio interface, thus enabling the wireless device 200 to communicate in transmission beams and reception beams over the radio interface.

The wireless device 200 is configured to simultaneously sweep through all beams 120a-120L, 130a-130M for all analog antenna arrays 205a, 205b. Particularly, the wireless device 200 is configured to perform step S102:

S102: The wireless device 200 sweeps through the beams 120a-120L, 130a-130M. The beams 120a-120L, 130a-130M are swept thought for the wireless device 200 to obtain measurements of reference signals as transmitted by the network node 300. The wireless device 200 sweeps through the beams 120a-120L, 130a-130M by simultaneously using one beam 120a-120L, 130a-130M from each analog antenna array 205a, 205b. Beams 120a-120L, 130a-130M from all the analog antenna arrays 205a, 205b are thus simultaneously swept through for receiving the reference signals.

That is, at any given point in time one of the beams 120a-120L from analog antenna array 205a and one of the beams 130a-130M from analog antenna array 205b are simultaneously. That is, at any given point in time a combination of beams 120a-120L, 130a-130M with one beam from each analog antenna array 205a, 205b is used for receiving the reference signals. The wireless device 200 then evaluates which combination of beams that is best. Particularly, the wireless device 200 is configured to perform step S106:

S106: The wireless device 200 determines which combination of beams 120a-120L, 130a-130M to use for communicating with the network node 300. The determination is based on measurements of the reference signals as received for each beam 120a-120L, 130a-130M and for each analog antenna array 205a, 205b when sweeping through the beams 120a-120L, 130a-130M. The combination of beams 120a-120L, 130a-130M includes one beam 120a-120L, 130a-130M from each analog antenna array 205a, 205b.

That is, in comparison to conventional beam training as disclosed above, the herein disclosed embodiments allow the network node 300 to in each TRP TX beam only to transmit as many reference signals as there are WD RX beams per analog antenna array 205a, 205b. The wireless device 200 simultaneously sweeps the WD RX beams for each respective analog antenna array 205a, 205b whilst performing measurements on the reference signals. So for example if the wireless device 200 comprises two analog antenna array 205a, 205b and is configured to use two beams 120a-120L, 130a-130M per analog antenna array 205a, 205b, the network node 300 only needs to transmit two occurrences of reference signals. For the first occurrence the wireless device 200 performs measurements on the first beam of each analog antenna array 205a, 205b (simultaneously), and for the second occurrence signal the wireless device 200 performs measurement on the second beam of each analog antenna array 205a, 205b (simultaneously).

Embodiments relating to further details of beam training as performed by the wireless device 200 will now be disclosed.

It is envisioned that there could be different types of reference signals that are transmitted by the network node 300 and received by the wireless device 200 when sweeping through the beams 120a-120L, 130a-130M. According to an embodiment the reference signals are CSI-RS.

Reference is now made to FIG. 5 illustrating methods for beam training as performed by the wireless device 200 according to further embodiments. It is assumed that steps S102, S106 are performed as described above with reference to FIG. 4 and a thus repeated description thereof is therefore omitted.

In some aspects the wireless device 200 stores the measurements for each beam 120a-120L, 130a-130M for each analog antenna array 205a, 205b. Hence, according to an embodiment the wireless device 200 is configured to perform step S104:

S104: The wireless device 200 stores the measurements of the reference signals for each beam 120a-120L, 130a-130M and for each analog antenna array 205a, 205b.

There could be different ways for the wireless device 200 to determine which combination of beams 120a-120L, 130a-130M to use. In some aspects the wireless device 200 determines a preferred beam setting per analog antenna array 205a, 205b that maximizes the estimated performance in downlink and/or uplink. Particularly, according to an embodiment the wireless device 200 is configured to perform step S106a as part of determining which combination of beams 120a-120L, 130a-130M in step S106:

S106a: The wireless device 200 estimates, based on the measurements of the reference signals, a respective communications performance value for using each of the combinations of beams 120a-120L, 130a-130M for communications with the network node 300. Which combination of beams 120a-120L, 130a-130M to use is then selected as the combination having highest estimated communications performance value. The determined combination of beams 120a-120L, 130a-130M to use thus has highest estimated communications performance value. Examples of communications performance values will be provided below.

In some aspects the same beams 120a-120L, 130a-130M are used for transmission and reception. That is, according to an embodiment the combination of beams 120a-120L, 130a-130M is for downlink as well as uplink communications with the network node 300.

In some aspects the beams 120a-120L, 130a-130M are determined based on the estimated downlink and/or uplink user throughput (for example depending on whether the wireless device 200 is expecting most downlink data transmissions or most uplink data transmissions). That is, according to an embodiment the communications performance value relates to user throughput for at least one of downlink and uplink communications with the network node (300). Advantageously this results in a performance increase in terms of user throughput in downlink and/or uplink compared to conventional beam training.

In some aspects the same beams 120a-120L, 130a-130M are not selected for downlink as in uplink. The best beam for downlink and the best beam for uplink can differ, for example due to different interference situations in uplink and downlink. Hence, according to an embodiment a respective separate combination of beams 120a-120L, 130a-130M is determined for downlink communications with the network node 300 and for uplink communications with the network node 300. The wireless device 200 will then switch between the RX and TX beams depending on whether the wireless device is receiving data or transmitting data.

In case there is reciprocity between downlink and uplink within each analog antenna array 205a, 205b, both the combination of beams 120a-120L, 130a-130M to use for transmission and combination of beams 120a-120L, 130a-130M to use for reception could be determined on the measurements of the reference signals. Hence, according to an embodiment the combination of beams 120a-120L, 130a-130M for uplink communications is determined based on the combination of beams 120a-120L, 130a-130M for downlink communications and using reciprocity between downlink and uplink.

In some aspects the beams 120a-120L, 130a-130M for reception are selected based on downlink user throughput and the beams 120a-120L, 130a-130M for transmission are selected based on highest RSRP in order to improve the coverage in uplink. That is, according to an embodiment the communications performance value relates to user throughput for the combination of beams 120a-120L, 130a-130M for downlink communications with the network node 300 and to reference signal received power for the combination of beams 120a-120L, 130a-130M for uplink communications with the network node 300.

In some aspects the wireless device 200 is aware of the highest number of layers that the network node 300 can use during transmission and/or reception and the wireless device 200 uses this information when estimating throughputs. That is, according to an embodiment the user throughput is dependent on the highest number of layers in which the network node 300 is able to communicate with the wireless device 200. This information about the highest number of layers might, for example, be signaled from the network node 300 to the wireless device 200. Alternatively, the wireless device 200 could use logged information about the highest number of layers used during previous data transmissions with a certain network node 300.

When communicating with the network node 300 the wireless device 200 could then use the determined combination of beams 120a-120L, 130a-130M. Hence, according to an embodiment the wireless device 200 is configured to perform step S108:

S108: The wireless device 200 communicates with the network node 300 using the determined combination of beams 120a-120L, 130a-130M.

Figure 6:
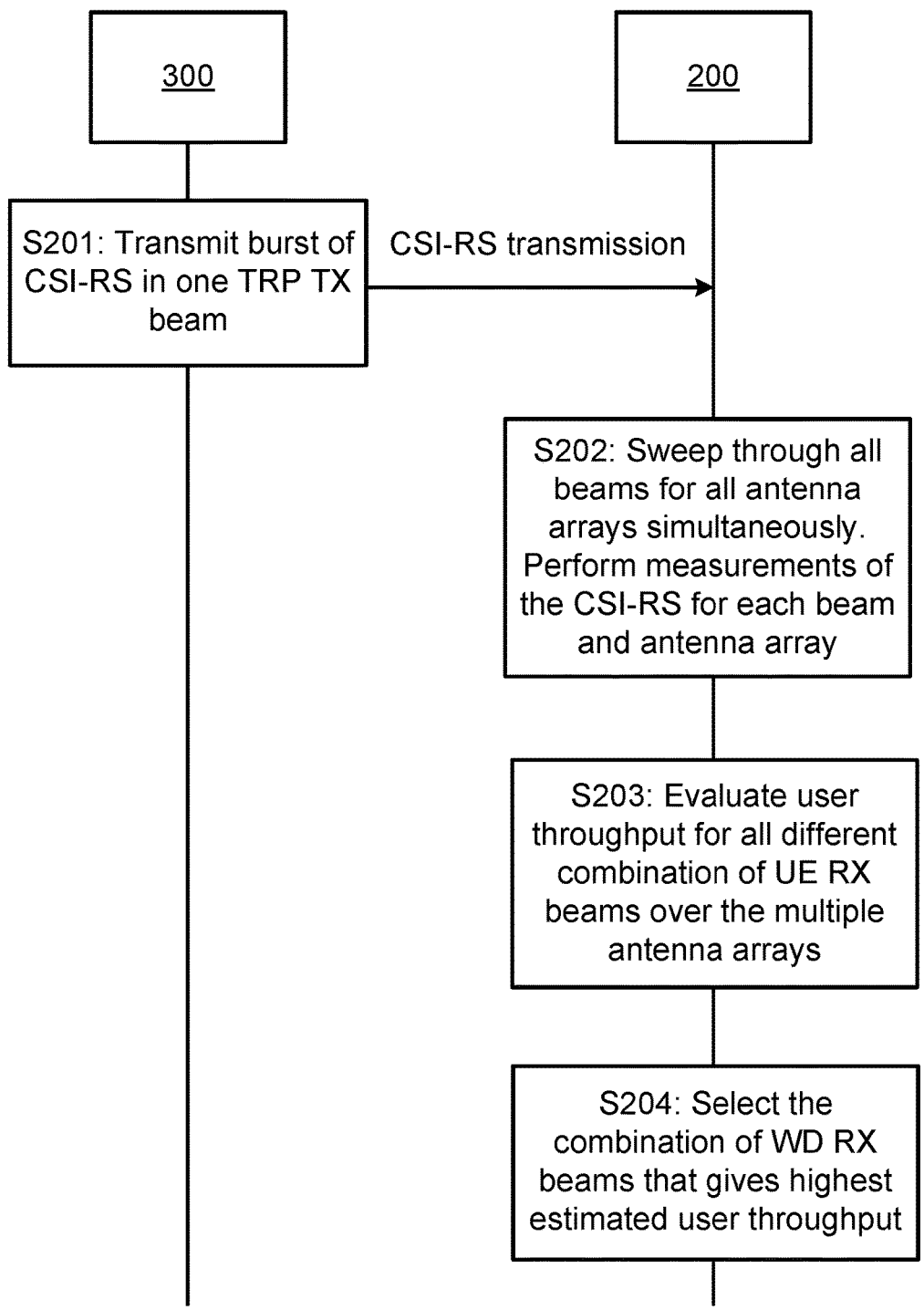
FIG. 6 is a signaling diagram of beam training according to an embodiment.

One particular embodiment for beam training as performed by the wireless device 200 based on at least some of the above embodiments will now be disclosed with reference to the signaling diagram of FIG. 6.

S201: The network node 300, possible via a TRP, transmits a burst of CSI-RSs per polarization and per TRP TX beam. The CSI-RS is thus transmitted in a set of TRP TX beams, where the network node 300 uses as many occurrences of CSI-RSs per burst as there are WD RX beams per analog antenna array 205a, 205b in the wireless device 200.

S202: The wireless device 200 sweeps through all beams 120a-120L, 130a-130M for all analog antenna arrays 205a, 205b simultaneously. For each beam and analog antenna array, the wireless device 200 performs measurements on the CSI-RS and stores the measurements for each beam 120a-120L, 130a-130M and analog antenna array 205a, 205b. One way to implement step S202 is to perform step S102, optionally together with step S104.

S203: The wireless device 200 evaluates user throughput for all different combinations of WD RX beams over all analog antenna arrays 205a, 205b, where each combination consists of one single beam from each of the analog antenna arrays 205a, 205b. One way to implement step S203 is to perform step S106a.

S204: The wireless device 200 selects the combination of WD RX beams that gives the highest estimated user throughput. One way to implement step S203 is to perform step S106.

Figure 7:
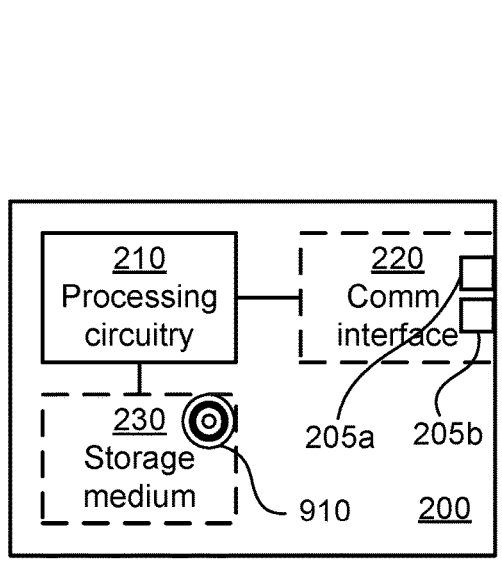
FIG. 7 is a schematic diagram showing functional units of a wireless device according to an embodiment.

FIG. 7 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S108, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless device 200 may further comprise a communications interface 220 at least configured for communications with other entities, nodes, and devices, such as the network node 300, of the communications system 100. As such the communications interface 220 may comprise one or more transmitters and receivers, comprising analogue and digital components. Particularly, the wireless device 200 comprises at least two analog antenna arrays 205a, 205b that might be part of the communications interface 220. The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 8:
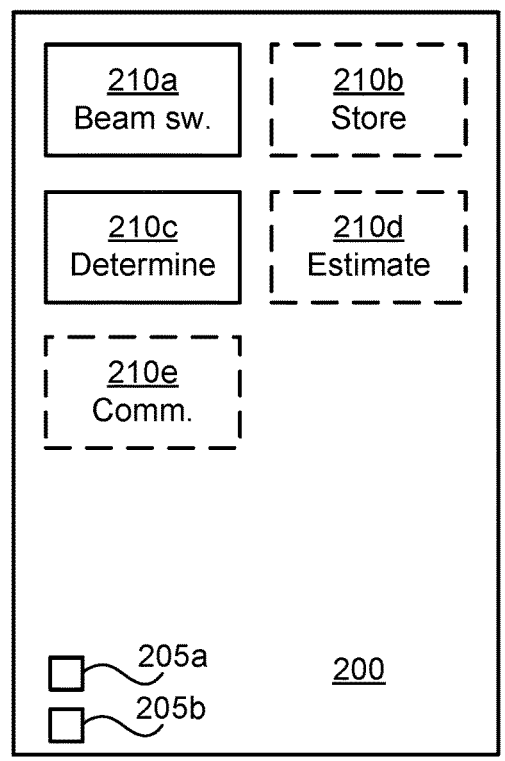
FIG. 8 is a schematic diagram showing functional modules of a wireless device according to an embodiment.

FIG. 8 schematically illustrates, in terms of a number of functional modules, the components of a wireless device 200 according to an embodiment. The wireless device 200 of FIG. 8 comprises at least two analog antenna arrays 205a, 205b in addition to a number of functional modules; a beam sweep module 210a configured to perform step S102 and a determine module 210c configured to perform step S106. The wireless device 200 of FIG. 8 may further comprise a number of optional functional modules, such as any of a store module 210b configured to perform step S104, an estimate module 210d configured to perform step S106a, and a communicate module 210c configured to perform step S108. In general terms, each functional module 210a-210e may in one embodiment be implemented only in hardware and in another embodiment with the help of software, i.e., the latter embodiment having computer program instructions stored on the storage medium 230 which when run on the processing circuitry makes the wireless device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

Figure 9:
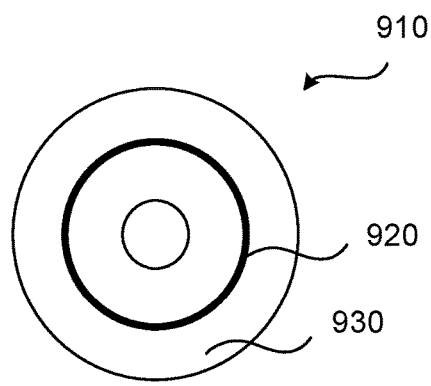
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method performed by a wireless device, the method comprising:
   using a first analog antenna array to obtain a first measurement by using a first beam to receive a first reference signal;
   while using the first analog antenna array to obtain the first measurement, using a second analog antenna array to obtain a second measurement by using a second beam to receive the first reference signal;
   after using the first and second analog antenna arrays to obtain the first and second measurements, using the first analog antenna array to obtain a third measurement by using a third beam to receive a second reference signal;
   while using the first analog antenna array to obtain the third measurement, using the second analog antenna array to obtain a fourth measurement using a fourth beam to receive the second reference signal;
   based on at least the first and third measurements, selecting a first selected beam from a first set of beams, wherein the first set of beams includes the first and the third beams, but does not include the second and the fourth beams; and based on at least the second and fourth measurements, selecting a second selected beam from a second set of beams, wherein the second set of beams includes the second and the fourth beams, but does not include the first and the third beams.

2. The method of claim 1, further comprising:
estimating a first communications performance value for using a combination of the first beam and the second beam to communicate with a network node; and
estimating a second communications performance value for using a combination of the third beam and the fourth beam to communicate with the network node, wherein the first selected beam is the first beam,
the second selected beam is the second beam, and
the estimated first communications performance value is higher than the estimated second communications performance value.

3. The method of claim 1, wherein a combination of the first selected beam and the second selected beam is for downlink as well as uplink communications with a network node.

4. The method of claim 2, wherein each of the first communications performance value and the second communications performance value relates to user throughput for at least one of downlink and uplink communications with the network node.

5. The method of claim 1, wherein a respective separate combination of beams is determined for downlink communications with a network node and for uplink communications with the network node.

6. The method of claim 3, wherein the combination of the first selected beam and the second selected beam is determined to be used for uplink communications using reciprocity between downlink and uplink.

7. The method of claim 2, wherein
each of the first communications performance value and the second communications performance value relates to user throughput for downlink communications with the network node, and
each of the first communications performance value and the second communications performance value relates to reference signal received power for uplink communications with the network node.

8. The method of claim 4, wherein the user throughput is dependent on highest number of layers in which the network node is able to communicate with the wireless device.

9. The method of claim 1, further comprising:
storing the first, second, third, and fourth measurements.

10. The method of claim 1, further comprising:
communicating with a network node using a combination of the first selected beam and the second selected beam.

11. The method of claim 1, wherein each of the first analog antenna array and the second analog antenna array is a part of a respective antenna panel.

12. The method of claim 11, wherein one or more of the first analog antenna array and the second analog antenna array comprises single polarized antenna elements.

13. The method of claim 11, wherein one or more of the first analog antenna array and the second analog antenna array comprises dual polarized antenna elements.

14. The method of claim 1, wherein the first analog antenna array and the second analog antenna arrays are parts of a common antenna panel.

15. The method of claim 1, wherein the first and second reference signals are channel state information reference signals, CSI-RS.

16. A wireless device comprising processing circuitry and at least two analog antenna arrays including a first analog antenna array and a second analog antenna array, the processing circuitry being configured to cause the wireless device to:
use the first analog antenna array to obtain a first measurement by using a first beam to receive a first reference signal;
while using the first analog antenna array to obtain the first measurement, use the second analog antenna array to obtain a second measurement by using a second beam to receive the first reference signal;
after using the first and second analog antenna arrays to obtain the first and second measurements, use the first analog antenna array to obtain a third measurement by using a third beam to receive a second reference signal;
while using the first analog antenna array to obtain the third measurement, use the second analog antenna array to obtain a fourth measurement using a fourth beam to receive the second reference signal;
based on at least the first and third measurements, select a beam from a first set of beams, wherein the first set of beams includes the first and the third beams, but does not include the second and the fourth beams; and
based on at least the second and fourth measurements, select a beam from a second set of beams, wherein the second set of beams includes the second and the fourth beams, but does not include the first and the third beams.

17. A computer program product comprising a non-transitory computer readable medium storing a computer program for beam training, the computer program comprising computer code which, when run on processing circuitry of a wireless device comprising at least two analog antenna arrays including a first analog antenna array and a second analog antenna array, causes the wireless device to:
use the first analog antenna array to obtain a first measurement by using a first beam to receive a first reference signal;
while using the first analog antenna array to obtain the first measurement, use the second analog antenna array to obtain a second measurement by using a second beam to receive the first reference signal;
after using the first and second analog antenna arrays to obtain the first and second measurements, use the first analog antenna array to obtain a third measurement by using a third beam to receive a second reference signal;
while using the first analog antenna array to obtain the third measurement, use the second analog antenna array to obtain a fourth measurement using a fourth beam to receive the second reference signal;
based on at least the first and third measurements, select a beam from a first set of beams, wherein the first set of beams includes the first and the third beams, but does not include the second and the fourth beams; and
based on at least the second and fourth measurements, select a beam from a second set of beams, wherein the second set of beams includes the second and the fourth beams, but does not include the first and the third beams.

* * * * *